US008792465B2

(12) United States Patent
Frecassetti et al.

(10) Patent No.: US 8,792,465 B2
(45) Date of Patent: Jul. 29, 2014

(54) METHOD AND APPARATUS FOR TRANSMITTING A GIGABIT-ETHERNET SIGNAL BY A HIGH CAPACITY POINT-TO-POINT RADIO SYSTEM

(75) Inventors: Mario Giovanni Frecassetti, Bergamo (IT); Claudio Colombo, Biassono (IT); Primo Garofoli, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 1471 days.

(21) Appl. No.: 10/265,441

(22) Filed: Oct. 7, 2002

(65) Prior Publication Data

US 2003/0072323 A1    Apr. 17, 2003

(30) Foreign Application Priority Data

Oct. 11, 2001  (EP) .................................... 01402622

(51) Int. Cl.
*H04W 4/00*  (2009.01)
(52) U.S. Cl.
USPC .......................................... 370/338; 370/328
(58) Field of Classification Search
USPC ............ 455/73, 562, 505; 359/115; 370/216, 370/203, 208, 466, 467, 468, 470, 472, 207, 370/232, 395.51, 481, 483, 521, 543, 910
See application file for complete search history.

(56) References Cited

U.S. PATENT DOCUMENTS

| | | | | | |
|---|---|---|---|---|---|
| 4,876,742 | A | * | 10/1989 | Vacon et al. .................. | 455/41.2 |
| 5,436,902 | A | * | 7/1995 | McNamara et al. ........... | 370/447 |
| 5,574,717 | A | * | 11/1996 | Tomizawa et al. ............ | 370/244 |
| 5,636,213 | A | * | 6/1997 | Eastmond et al. ............ | 370/278 |
| 5,729,282 | A | * | 3/1998 | Okawa ........................ | 348/14.12 |
| 5,822,307 | A | * | 10/1998 | Eastmond et al. ............ | 370/278 |
| 6,014,708 | A | * | 1/2000 | Klish ........................... | 709/232 |
| 6,025,944 | A | * | 2/2000 | Mendez et al. ................ | 398/78 |

(Continued)

FOREIGN PATENT DOCUMENTS

| | | | | |
|---|---|---|---|---|
| EP | 0157412 | * | 2/1985 | ............... H04B 1/74 |
| EP | 0 982 900 A2 | | 3/2000 | |

(Continued)

OTHER PUBLICATIONS

G. Paoli, "Synchronous Radio: A System Solution to Integrate Microwave and Optical Techniques", *World Telecommunication Forum Technical Symposium. Integration Interoperation and Interconnection: The Way to Global Services*, Geneva, CH, vol. 2, Oct. 10, 1991, pp. 137-141.

(Continued)

*Primary Examiner* — Phirin Sam
(74) *Attorney, Agent, or Firm* — Wolff & Samson, PC

(57) ABSTRACT

A method and apparatus are described for transmitting/receiving a Gigabit-Ethernet signal by a high capacity point-to-point radio system. The basic idea consists in transmitting a Gigabit Ethernet interface using a single frequency in a channel plan of about 56 MHz bandwidth. The invention is based on a technology that combines forward error correction, cross polarization interference cancellation (XPIC), base-band signal processing, adaptive equalization and antenna's interconnection. In the best configuration, two carrier frequencies, H and V polarized, are selected in order to have the required bandwidth for easily transporting a Gigabit Ethernet. A proper compression rate can be selected according to the available resources; in case of radio channel failure, the compression rate can be changed. Ethernet frames are mapped by a Generic Framing Procedure encapsulation protocol.

15 Claims, 3 Drawing Sheets

(56) References Cited

U.S. PATENT DOCUMENTS

| | | | |
|---|---|---|---|
| 6,091,777 A * | 7/2000 | Guetz et al. | 375/240.11 |
| 6,122,281 A * | 9/2000 | Donovan et al. | 370/401 |
| 6,167,155 A * | 12/2000 | Kostrzewski et al. | 382/232 |
| 6,205,130 B1 * | 3/2001 | DeJaco | 370/335 |
| 6,256,306 B1 | 7/2001 | Bellenger | 370/389 |
| 6,418,324 B1 * | 7/2002 | Doviak et al. | 455/426.1 |
| 6,445,926 B1 * | 9/2002 | Boch et al. | 455/447 |
| 6,556,836 B2 * | 4/2003 | Lovberg et al. | 455/505 |
| 6,731,656 B1 * | 5/2004 | Slater et al. | 370/536 |
| 6,847,655 B2 * | 1/2005 | Colombo et al. | 370/474 |
| 6,847,820 B1 * | 1/2005 | Hageltorn et al. | 455/446 |
| 6,934,301 B2 * | 8/2005 | Jordan | 370/466 |
| 6,970,467 B1 * | 11/2005 | Sunaga et al. | 370/395.1 |
| 7,002,941 B1 * | 2/2006 | Treadaway et al. | 370/338 |
| 7,042,904 B2 * | 5/2006 | Kamiya | 370/466 |
| 7,050,399 B2 * | 5/2006 | Masuda | 370/245 |
| 7,069,342 B1 * | 6/2006 | Biederman | 709/247 |
| 7,248,588 B2 * | 7/2007 | Heuer | 370/395.31 |
| 2001/0040944 A1 * | 11/2001 | Dunn et al. | 379/90.01 |
| 2002/0027905 A1 * | 3/2002 | Heuer | 370/386 |
| 2002/0122231 A1 * | 9/2002 | Verbana et al. | 359/145 |
| 2002/0151309 A1 * | 10/2002 | Johnson et al. | 455/447 |
| 2002/0176389 A1 * | 11/2002 | Colombo et al. | 370/338 |
| 2003/0016697 A1 * | 1/2003 | Jordan | 370/466 |

FOREIGN PATENT DOCUMENTS

| | | |
|---|---|---|
| EP | 0982900 A2 * | 3/2000 |
| EP | 1 124 355 A2 | 8/2001 |
| EP | 1124355 A2 * | 8/2001 |

OTHER PUBLICATIONS

Carlisle et al., "Architectures and Functional Aspects of Radio Relay Systems for SDH Networks", *Globecom '91*, IEEE, vol. 3, Dec. 2, 1991, pp. 856-860.

Armstrong et al., "GFP for Ethernet", *Contribution to T1 Standards Project*, XX, Jul. 10, 2000, pp. 1-6 (XP-000949000).

* cited by examiner

METHOD AND APPARATUS FOR TRANSMITTING A GIGABIT-ETHERNET SIGNAL BY A HIGH CAPACITY POINT-TO-POINT RADIO SYSTEM

INCORPORATION BY REFERENCE OF PRIORITY DOCUMENT

This application is based on, and claims the benefit of, European Patent Application No. 01402622.3 filed on Oct. 11, 2001, which is incorporated by reference herein.

BACKGROUND OF THE INVENTION

1. Field of the Invention

The present invention relates to a method and apparatus for transmitting a 1.250 Gbit/s signal, namely a Gigabit Ethernet signal, by a high capacity point-to-point radio system using a number of RF carries ranging from one to four.

2. Description of the Prior Art

As it is known, the corporate backbone was the initial target for Gigabit Ethernet. The link distances were chosen specifically to address the backbone application space, using the fiber most commonly installed in both building and campus backbones. Metropolitan Area Networks (MANs) represent another application area for Gigabit Ethernet. Organizations that own or lease dedicated fiber-optic cable runs may find that Gigabit Ethernet provides a low-cost way to move massive amounts of data between sites.

In the future, Gigabit Ethernet may become an alternative to the services provided by the Public Switched Network. Its real advantage over competing technologies is that upgrades can be done incrementally, as needed, with minimal network disruption. The keys to smooth upgrades are analyses of bandwidth and cabling requirements.

The present invention generally relates to the transmission of Gigabit Ethernet signals through a high capacity point-to-point radio link.

The easier and known method for transmitting such signals could be selecting a certain frequency $f_0$ (with $f_0$ ranging 59-64 GHz) and taking a 1 GHZ bandwidth around such a selected frequency. using a proper protocol, it is possible to transmit Gigabit Ethernet signals.

As a skilled person can understand, such a transmission technique can not be applied in the standard radio link frequencies (ranging 6-38 GHz) because the bandwidths are limited (each channel has a fixed band from 28 to 56 MHz depending on the channel plan). Thus, the above simple approach can be used only with frequencies ranging from 59 to 64 GHz that could be used without any restrictions.

The main advantage of the above known solution is that, thanks to the high oxygen absorption occurring at these high frequencies, the transmission is more free of interference problems due to possible close antennas. On the contrary, the disadvantage is that radio link length is necessarily short, say less of 1 km.

SUMMARY OF THE INVENTION

In view of such an inconvenience, the main object of the present invention is providing a method and apparatus for transmitting a 1.250 Gbit/s signal, namely a Gigabit Ethernet signal, by a point-to-point fixed radio system and using standard radio frequencies ranging from 6 to 38 GHz., with modulation schemes and coding format able to transmit high capacity (greater than STM-1).

A further object of the present invention is providing a method and apparatus for transmitting Gigabit Ethernet signals by a fixed point-to-point radio system, wherein the link distance is acceptable (more than 10 Km) for most uses and in principle is longer than the one of the known technique.

These and further objects are obtained by a method and apparatus as set forth in claims 1 and 14, respectively. Further advantageous characteristics of the present invention are indicated in the dependent claims. All the claims are intended to be an integral part of the present description.

The basic idea of the present invention consists in transmitting a Gigabit Ethernet interface with a fixed point-to-point radio system using a single frequency in a channel plan of about 56 MHz bandwidth. The invention is based on a technology that combines forward error correction, cross polarization interference cancellation (XPIC), base-band signal processing, adaptive equalization and antenna's interconnection.

The present invention will become clear after reading the following detailed description, given by way of non limiting example, having reference to the attached sheets of drawings.

BEST MODE FOR CARRYING OUT THE INVENTION

Figure 1:
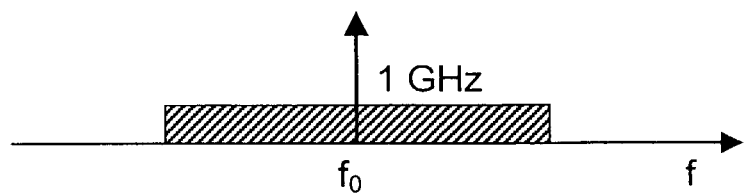
FIG. 1 shows the known manner for transmitting a Gigabit Ethernet by using a single high frequency between 59 and 64 GHz.

FIG. 1 shows the known manner for transmitting a Gigabit Ethernet by using a single high frequency between 59 and 64 GHz. The whole 1.25 GHz bandwidth is used for Gigabit Ethernet transmission.

In microwave radio link digital transmission there is the need to increase as far as possible the information transmitted per unit of occupied band. Frequency reuse consists in transmitting two independent data sequences on the same RF carrier frequency, discriminated by means of orthogonal polarization (H and V for instance), so doubling the system spectral efficiency.

A Cross Polar Interference Cancellation technique (XPIC) and other particular antenna interconnection are used to optimize the channel occupancy and the spectral efficiency of the whole system. The main advantage is that higher capacity wireless communications are supported without increasing bandwidth or modulation levels.

Figure 2:
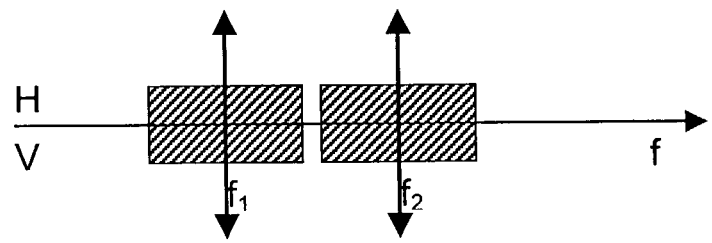
FIG. 2 shows the basic principle of a preferred embodiment of the present invention.

With the frequency reuse concept in mind, the basic principle on which the present invention is based will become clear with reference to FIG. 2. Four radio channels are employed, the channels being obtained by taking a first carrier $f_1$ at 311 Mbit/s and a second carrier $f_2$ at 311 Mbit/s (we can consider $f_1 = f_2$ or $f_1 \neq f_2$ depending on the radio application). The two carriers are in the range of fixed point-to-point standard radio frequencies (6-38 GHz) and could occupy a minimum bandwidth of about 50 or 56 MHz. The two carriers are both H and V polarized. In this manner, using the cross-polar cancellation techniques, band enough for transmitting a Gigabit Ethernet signal will be provided using the same radio channel.

In case the signal to be wireless transmitted is not compressed, all the four carriers should be used. Should a certain compression rate be performed, two (or even a single) carriers can be profitably used.

Figure 3:
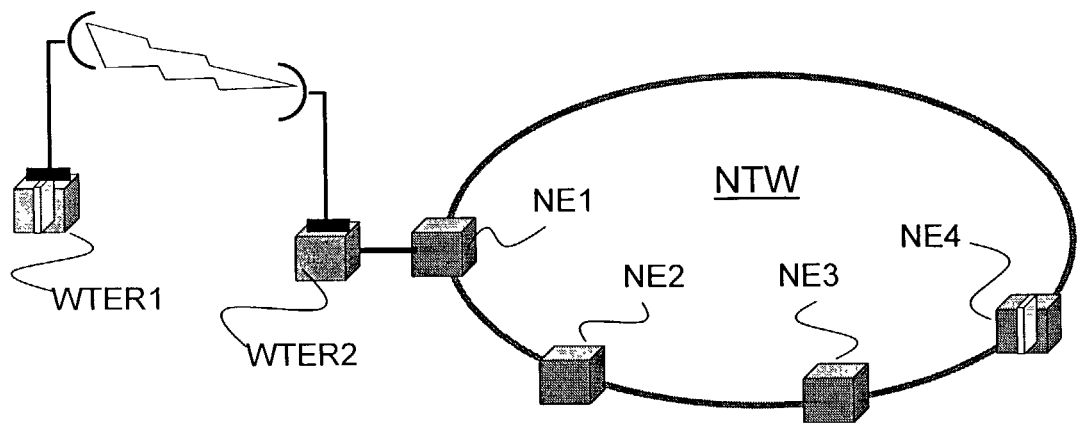
FIG. 3 shows a possible application of the present invention.

Before disclosing in detail a preferred embodiment of the present invention, a possible application thereof will be provided with reference to FIG. 3. The Gigabit Ethernet is point-to-point radio transmitted from a first wireless terminal WTER1 to a second wireless terminal WTER2. From such a second terminal, the signal could be dropped, further point-to-point radio transmitted or passed to a network NTW having a plurality of network nodes NE. The network can be a ring SDH (or SONET) network. Again, the signal can be dropped at one of such nodes (for instance NE4), passed to another node of an adjacent network (not shown) or radio point-to-point further transmitted. While the second radio terminal and the first network node (for instance an ADM, Add-Drop Multiplexer) have been shown as two separate entities, their functions could be grouped into, and performed by, a single apparatus.

In principle, as said above, by using two carriers, H and V polarized, the required bandwidth can be obtained for easily transporting a Gigabit Ethernet. In real applications, it has been observed that rarely the traffic profiles at most of routers are higher than 60-70 Mbit/s. Having considered this, there is a scarce risk to loose information if certain compression is carried out at the transmitting wireless terminal. If a proper compression rate is chosen, a single carrier can be used without jeopardizing the transmission with the consequent advantage of significantly increasing the whole system spectral efficiency.

Figure 4:
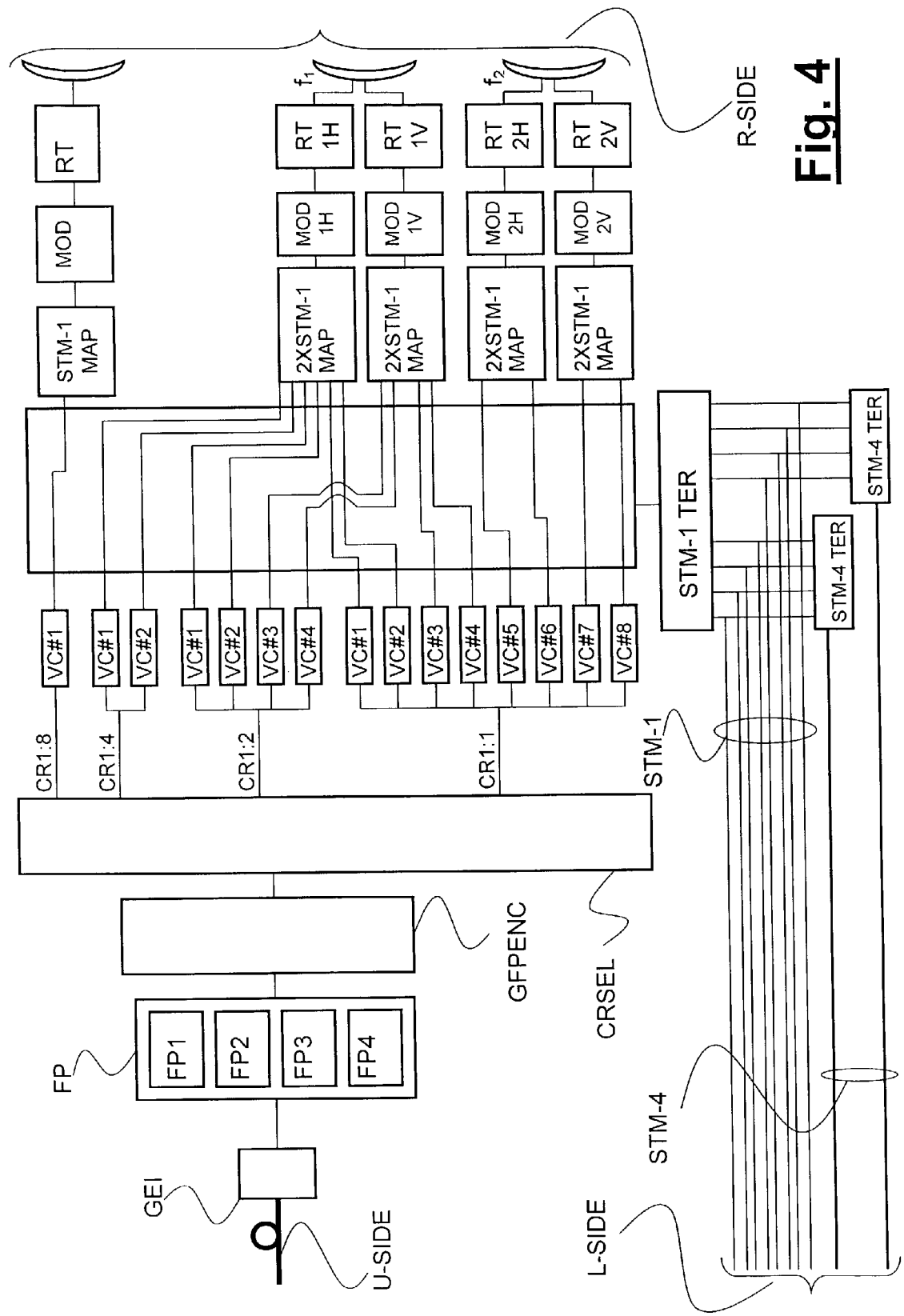
FIG. 4 shows a basic block arrangement of a radio transceiver terminal apparatus performing the present invention.

FIG. 4 shows a basic block arrangement of a radio transceiver terminal apparatus performing the present invention. The radio transceiver comprises a user side U-SIDE, a radio side R-SIDE and, possibly, a line side L-SIDE for connection thereof with physical line. The user side U-SIDE comprises a user interface GEI for receiving a Gigabit Ethernet signal and a first block FP for processing the received Ethernet frames. Among the processing that is carried out in the Ethernet frame processing block are: Ethernet frame termination (FP1), frame delineation (FP2), MAC (namely the mode by which Ethernet is transmitted) termination (FP3), flow control and buffering (FP4). Frame delineation is required because, as it is known, Ethernet protocol provides for transmitting both packets and pauses but, for the purposes of the present invention, only useful information packets should be considered and transmitted on the SDH layer.

Ethernets are connectionless in nature. As such, there is no concept of a virtual circuit and no guarantee made regarding the delivery of a given frame. Frames are transferred without error to a high degree of probability, but there is no absolute assurance of success. In the event of a bit error, receiver buffer unavailability, or any other abnormal occurrence, an Ethernet receiver will simply discard the frame without providing any notification of that action.

So, high level of coding process, FEC and adaptive equalization techniques are used to perform an higher availability of the radio channel against fading phenomena or noisy situation, in order to decrease the Frame Loss Rate over the Ethernet transmitted packets.

As it is clear, the flow control feature is required because data transfer rate should be limited to the SDH (or SONET) Virtual Container capacity by the active flow control mechanism according to the relevant Standard. The flow control and buffering could be additional advantageous features when the basic idea of the present invention is used for protecting the radio link against possible failures. The protection feature will be fully disclosed below.

Figure 5:
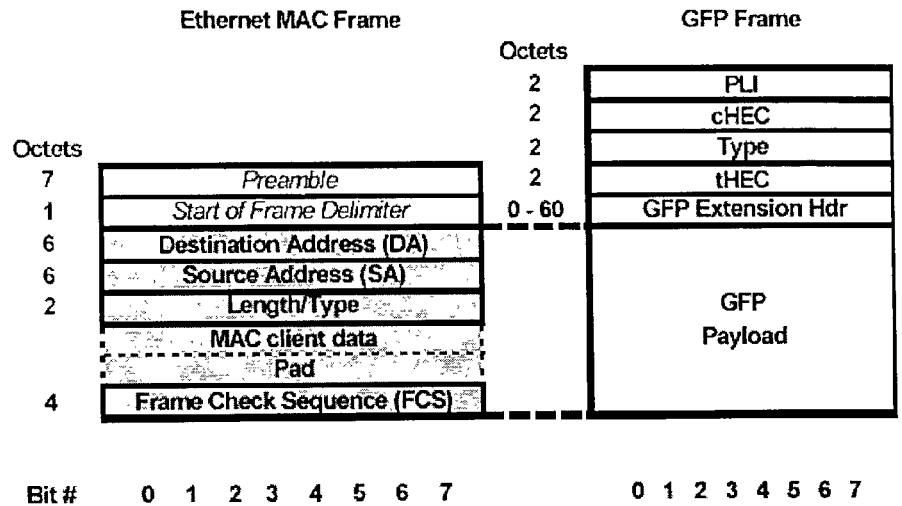
FIG. 5 shows a GFP frame obtained by an Ethernet MAC frame for a better understanding of the present invention.

As far as frame processing is concerned, in order to packet Ethernet frames in a SDH/SONET payload, a proper adaptation layer should be used. Ethernet frames can be mapped in SDH/SONET Virtual Containers using GFP (Generic Framing Procedure) encapsulation protocol, required to be transported over SDH/SONET layer. FIG. 5 shows a GFP frame obtained by an Ethernet MAC frame for a better understanding of the present invention. GFP encoding is performed by GFPENC of FIG. 4.

The purpose of GFP is to provide a single flexible mechanism to map/adapt any client signal into SONET/SDH. It profitably supports both point-to-point and ring applications.

GFP provides frame delineation by using a length/HEC mechanism. This mechanism is considered more robust than single octet flag based delineation and eliminates the need for byte/bit stuffing and the resulting payload specific frame expansion.

GFP mandatory fields are divided into a Core Header and a Payload Header. The Core Header is used for frame delineation. The Payload Header is primarily used to identify the presence and format of an Extension Header and which client protocol is being carried.

The Extension Header mechanism allows for topology/application specific information to be added to the GFP frame. Positive features of GFP are: more robust frame delineation than flag-based mechanisms such as HDLC; no payload dependent frame expansion (no byte stuffing); flexibility of Extension Headers (this allows for topology/application specific fields to be defined without affecting frame delineation functions); ability to identify the encapsulated client protocol separately from the Extension Header (this could be used for example to allow frame forwarding based on Extension Header fields without requiring recognition of the encapsulated client protocol); and GFP FCS that allows for fault location on a GFP frame basis without requiring recognition of the encapsulated client protocol (it also provides a data integrity mechanism for encapsulation of protocols which may not have such a mechanism).

While the above listed features make GFP ideally suited for carrying variable length frames over SONET/SDH rings, this protocol choice should not be considered as limiting.

In other words, GFP frames are obtained by adding a proper GFP header to the original Ethernet payload. The GFP frames are then mapped on SDH/SONET Virtual Container. Conveniently, each GFP packet is sequentially numbered by means of a header field in order to recover the exact order at the receiving side. A different number of Virtual Containers (for instance VC-4) will be employed and they could be filled by a scheduler. As an alternative, the VCs could be virtually concatenated in order to have a better flexibility in the network. In the receiver side, the single VC-4s can reach the destination with different delays but the machine will be able to re-assembly the signal with the exact order of the transmitted packets.

The possible compression ratio CR can be decided at a proper selector (CRSEL) according to the bandwidth availability on microwave section, namely:

compression ratio 1:1: the Gigabit Ethernet will be mapped in 8 VC-4 and the max. throughput will be equal to 1.25 Gb/s;

compression ratio 1:2: the Gigabit Ethernet will be mapped in 4 VC-4 and the max. throughput will be equal to 622.08 Mb/s;

compression ratio 1:4: the Gigabit Ethernet will be mapped in 2 VC-4 and the max. throughput will be equal to 311.04 Mb/s; or compression ratio 1:8: the Gigabit Ethernet will be mapped in 1 VC-4 and the max. throughput will be equal to 155.52 Mb/s.

According to the selected compression rate, different system configurations can be adopted:

compression rate 1:1 four carriers at 311.04 Mb/s (2xSTM-1) are provided to be transmitted with four transceiver equipment;

compression rate 1:2 two carriers at 311.04 Mb/s (2xSTM-1) are provided to be transmitted with two transceiver equipment;

compression rate 1:4 one carrier at 311.04 Mb/s (2xSTM-1) is provided to be transmitted with one transceiver equipment; or compression rate 1:8 one carrier at 155.52 Mb/s (a single STM-1) is provided to be transmitted with one transceiver equipment.

Each transceiver equipment is composed of a mapping block (MAP), a modulator (MOD), a RT and a corresponding antenna. In case of compression rate 1:4, as it is clear from FIG. 4, the transceiver equipment comprises a 2XSTM-1 MAP block, a MOD 1H block, an RT 1H block and an antenna. In case of compression rate 1:2, the transceiver equipment comprises two mapping blocks 2XSTM-1 MAP, two corresponding MOD 1H and MOD 1V blocks, two RT 1H and RT 1V blocks and a single antenna. As far as CR1:1 is concerned, the arrangement for CR1:2 is duplicated.

The 2xSTM-1 radio frame could be composed by a column interleaving procedure of the STM-1 signals coming from the base-band framing processing device.

In the radio side, four 2xSTM-1 (311.02 Mb/s) modems are provided. As said above, the modems use double polarized arrangement in order to transmit 622 Mb/s for frequency channel in a bandwidth of about 56 MHz. Preferably, the used modulation scheme is a 128 QAM that gives a spectral efficiency of about 11 bits/s/Hz.

The arrangement above described comprises the basic blocks and components. As already mentioned, the apparatus according to the present invention is able to be used in cooperation with a node of a network (see FIG. 3). In this case, an SDH/SONET termination block should be provided for terminating SDH/SONET signals. Furthermore, means (STM-1 TER and STM-4 TER) are provided for providing a physical termination of STM-1 or STM-4 signals.

Thus, the line-side L-SIDE physical termination comprises:

eight independent STM-1 physical terminations; or two independent STM-4 physical terminations. Such physical terminations are provided in order to permit a standard connection on a Network Node Interface (NNI) with a system able to cross-connect the single VC-4 transporting Ethernet packets.

Figure 6:
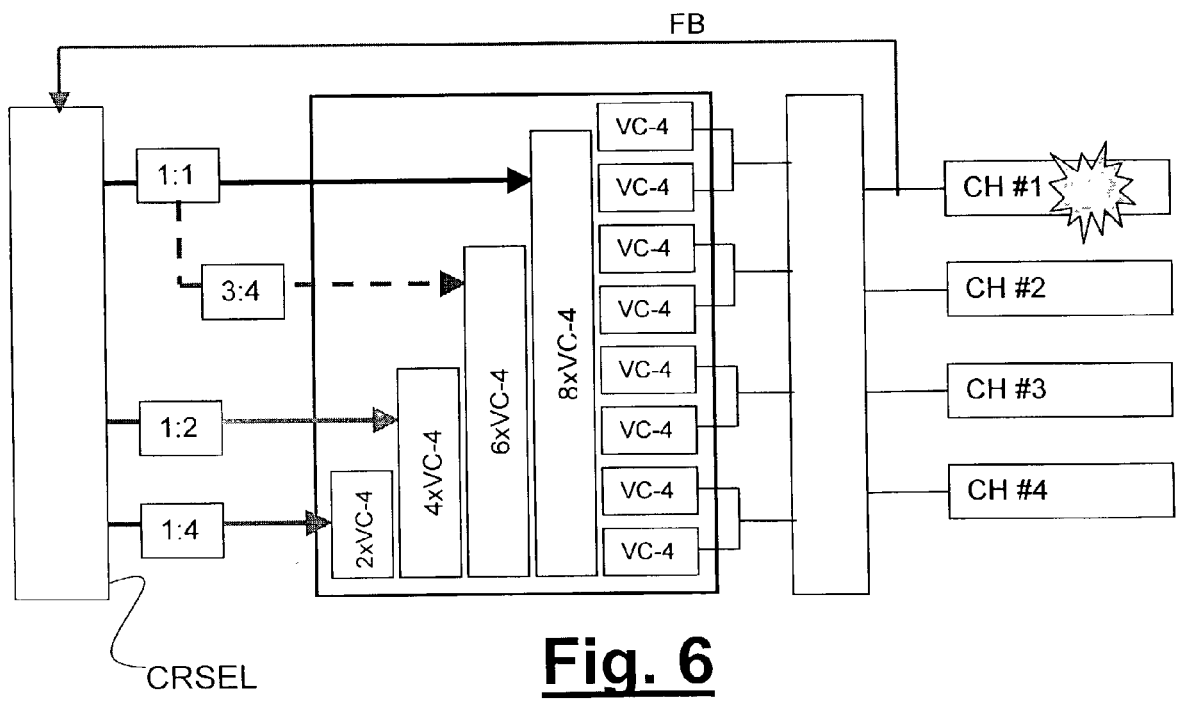
FIG. 6 shows the basic protection mechanism which is implemented by the present invention.

As said above, among the advantageous features of the apparatus according to the invention is the possibility to provide protection against channel failures. Such an advantageous feature is schematically shown in FIG. 6.

Inside the radio section, when a channel (for instance CH #1) becomes failured, a signaling is transmitted back (FB) to the compression rate selector CRSEL that is able to map all the packets on the VC-4s connected to the working channels (channels not failed), reducing the compression ratio and minimizing the packet loss condition. In particular, in FIG. 6, the compression rate changed from 1:1 to 3:4 because of the failure of CH#1.

The reduced throughput is controlled by the above mentioned flow control mechanism, and the decreased compression rate should force the system to work with a reduced number of VC-4s.

Each microwave carrier will transmit 2xVC-4, so when a carrier is in fault condition the system will reduce automatically its capacity of about 300 Mb/s decreasing temporarily the data throughput.

As it is known, because of the non-ideal nature of the hardware and transmitting medium, the two signals H and V tend to interfere with each other considerably. Therefore, preferably, cross-polar adaptive interference cancellation techniques (XPIC) are required at the receiving side. EP0, 552,692 relates to a method and system for synchronizing mutually interfering signals in digital radio transmission with frequency reuse and can be profitably used together with the present invention.

The new Gigabit Ethernet system offers service providers state-of-the-art functionality and an ideal building block for high-capacity wireless IP networks. The system will be designed to bridge high-capacity connections across the metropolitan area, particularly as a time-and-cost sensitive alternative to the deployment of a fiber network. The new product flexibility will enable service providers to expand their IP networks incrementally as demand increases.

The new solution allows service providers to offer Gigabit Ethernet services to their large business customers in an immediate and cost-effective manner. Additionally, as more private networks migrate from Fast Ethernet to Gigabit Ethernet, it provides high-capacity wireless connectivity between campus buildings. This creates an ultra-high speed Intranet network by connecting high-speed next generation Gigabit Ethernet switches.

The next generation of networks will require far greater flexibility and intelligence to manage high capacity data traffic. This implementation supports the market's anticipated need and underscores the commitment to innovation and market leadership.

There have thus been shown and described a novel method and a novel apparatus which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. An apparatus for transmitting a Gigabit-Ethernet signal through a fixed high capacity point-to-point radio system, the apparatus comprising:

a user interface for receiving a Gigabit-Ethernet signal to be transmitted;

means for selecting a transmission carrier frequency and an associated bandwidth, wherein said carrier frequency is in a range of 6 to 38 GHz and said associated bandwidth is less than 1.25 GHz;

a compression rate selector for compressing the Gigabit-Ethernet signal to be transmitted by a compression rate of 1:8, thus obtaining a compressed Gigabit-Ethernet signal, wherein the step of compressing comprises selecting a compression rate according to resources which are available in the radio link;

a mapper for mapping the compressed Gigabit-Ethernet signal in a single virtual container; and a transceiver means for transmitting the single virtual container through said fixed high capacity point-to-point radio system.

2. The apparatus of claim 1, further comprising feedback means for selecting the compression rate in response to a signaling indicating a failure of one or more radio channels.

3. The apparatus of claim 1, wherein said means for selecting a transmission carrier frequency selects a number of transmission carrier frequencies, wherein said number of transmission carrier frequencies depends on said compression rate.

4. An apparatus for transmitting a Gigabit-Ethernet signal through a fixed high capacity point-to-point radio system, the apparatus comprising:

a user interface for receiving a Gigabit-Ethernet signal to be transmitted;

means for selecting a transmission carrier frequency and an associated bandwidth, wherein said carrier frequency is in a range of 6 to 38 GHz and said associated bandwidth is less than 1.25 GHz;

a compression rate selector for compressing the Gigabit-Ethernet signal to be transmitted by a compression rate of 1:4, thus obtaining a compressed Gigabit-Ethernet signal, wherein the step of compressing comprises selecting a compression rate according to resources which are available in the radio link;

a mapper for mapping the compressed Gigabit-Ethernet signal in two virtual containers; and a transceiver means for transmitting the two virtual containers through said fixed high capacity point-to-point radio system.

5. The apparatus of claim 4, further comprising a mapper for mapping the two virtual containers into a single dual size STM-1.

6. The apparatus of claim 4, further comprising feedback means for selecting the compression rate in response to a signaling indicating a failure of one or more radio channels.

7. The apparatus of claim 4, wherein said means for selecting a transmission carrier frequency selects a number of transmission carrier frequencies, wherein said number of transmission carrier frequencies depends on said compression rate.

8. An apparatus for transmitting a Gigabit-Ethernet signal through a fixed high capacity point-to-point radio system, the apparatus comprising:

a user interface for receiving a Gigabit-Ethernet signal to be transmitted;

means for selecting a transmission carrier frequency and an associated bandwidth, wherein said carrier frequency is in a range of 6 to 38 GHz and said associated bandwidth is less than 1.25 GHz;

a compression rate selector for compressing the Gigabit-Ethernet signal to be transmitted by a compression rate of 1:2, thus obtaining a compressed Gigabit-Ethernet signal, wherein the step of compressing comprises selecting a compression rate according to resources which are available in the radio link;

a mapper for mapping the compressed Gigabit-Ethernet signal in four virtual containers; and a transceiver means for transmitting the four virtual containers through said fixed high capacity point-to-point radio system, wherein two independent data sequences, discriminated by orthogonal polarization, are transmitted on the same carrier frequency.

9. The apparatus of claim 8, further comprising a mapper for mapping the four virtual containers into two dual size STM-1.

10. The apparatus of claim 8, further comprising feedback means for selecting the compression rate in response to a signaling indicating a failure of one or more radio channels.

11. The apparatus of claim 8, wherein said means for selecting a transmission carrier frequency selects a number of transmission carrier frequencies, wherein said number of transmission carrier frequencies depends on said compression rate.

12. An apparatus for transmitting a Gigabit-Ethernet signal through a fixed high capacity point-to-point radio system, the apparatus comprising:

a user interface for receiving a Gigabit-Ethernet signal to be transmitted;

means for selecting a transmission carrier frequency and an associated bandwidth, wherein said carrier frequency is in a range of 6 to 38 GHz and said associated bandwidth is less than 1.25 GHz;

a compression rate selector for compressing the Gigabit-Ethernet signal to be transmitted by a compression rate of 1:1, thus obtaining a compressed Gigabit-Ethernet signal, wherein the step of compressing comprises selecting a compression rate according to resources which are available in the radio link;

a mapper for mapping the compressed Gigabit-Ethernet signal in eight virtual containers; and a transceiver means for transmitting the eight virtual containers through said fixed high capacity point-to-point radio system, wherein a further carrier frequency is selected in the range of 6 to 38 GHz, and means for transmitting two independent data sequences on the same carrier frequency, discriminated by orthogonal polarization.

13. The apparatus of claim 12, further comprising means for mapping the eight virtual containers into four dual size STM-1.

14. The apparatus of claim 12, further comprising feedback means for selecting the compression rate in response to a signaling indicating a failure of one or more radio channels.

15. The apparatus of claim 12, wherein said means for selecting a transmission carrier frequency selects a number of transmission carrier frequencies, wherein said number of transmission carrier frequencies depends on said compression rate.

* * * * *